United States Patent
Werling et al.

[11] 3,886,853
[45] June 3, 1975

[54] CHIMNEY DAMPER

[76] Inventors: George W. Werling, 2410 Wysstead Dr., Fort Wayne, Ind. 46819; James Edward Voirol, 1152 Oakdale Dr., Fort Wayne, Ind. 46807

[22] Filed: Mar. 28, 1974

[21] Appl. No.: 455,528

[52] U.S. Cl. ................................. 98/71; 98/74
[51] Int. Cl. ........................................ F23l 17/10
[58] Field of Search ........... 98/67, 68, 71, 74, 119, 98/77; 126/307 A

[56] References Cited
UNITED STATES PATENTS

| | | | |
|---|---|---|---|
| 1,133,324 | 3/1915 | Sillin | 98/71 |
| 1,410,624 | 3/1922 | Sylvan | 98/74 |
| 1,648,182 | 11/1927 | Kelm | 98/74 |
| 1,807,109 | 5/1931 | Wagar | 98/71 |
| 2,704,503 | 3/1955 | Roos | 98/68 |

*Primary Examiner*—William F. O'Dea
*Assistant Examiner*—Harold Joyce

[57] ABSTRACT

An improved flue damper is mounted for rotation at the top of a chimney or flue and has a shield with a rudder so that the shield is positioned in alignment with wind current. An aperture between the shield and the open end of the chimney is controlled by vanes, each of which is mounted on a scissors type linkage with two wind-catching elements or vanes which face into the wind and the force of the wind causes the two shutter means to come together and either reduce or entirely close the aperture so long as the shield is aligned with the wind current and the wind is strong enough to overcome a spring resistance in the scissors linkage to effect throttling or closure of the aperture.

7 Claims, 5 Drawing Figures

CHIMNEY DAMPER

BACKGROUND OF THE INVENTION

There have been numerous devices proposed in the past in combination with ventilators to control the ventilator opening. Such devices commonly provide shields and in some instances are responsive to wind forces in order to control the shield at the top of the ventilator opening. The prior art has employed draft controlling devices which are likewise mounted at the top of ventilators and the like and which have deflecting blades responsive to wind current in order to position the draft producing device. In general, the purpose of shields has been to guard against the inflow of cold or hot outside air, snow, ice, water and the like while providing or offering no obstruction to the free outlet of smoke or interior gasses and efficiently preventing down draft and the like.

These devices have not answered the need however, of preventing the occurrence of subatmospheric pressures which can cause wind, noise and other such objectionable results or heat loss from within a room where there is located a fireplace or the like.

OBJECTS OF THE INVENTION

It is one of the principal objects of the present invention to provide a novel draft control device at the top of a chimney or the like which is positionable by the wind and, while offering no substantial resistance to the upflow of smoke through the ventilator, will cause blockage of air flow past the chimney so as to reduce the occurrence of vacuum within the chimney and an accompanying objectionable noise and heat loss.

Another object of the present invention is to provide a novel ventilator control which is mounted at the upper end of a chimney and has a rudder which is responsive to wind currents so as to position the control in such a way that two wind-catching vane members associated with shutter members, will cause such shutters to come together responsively to movement of the wind-catching vanes which are caused to face into the wind as positioned by the damper control means. Such shutter means are effective for shielding the flow of air around and over the vent opening either in the form of chimney or the like thus preventing occurrence of vacuum within the chimney and a consequent heat loss.

It is a further object of the present invention to accomplish the foregoing objects while offering no obstacles to the outflow of smoke or other gasses in accordance with the normal functions of a chimney or other vent opening.

It is to be understood, that the vent control means can be used in connection with any vent other than a chimney including soil stacks, ventilator openings and the like and in brief any type means in which an opening must be shielded against inflow of water, snow, etc. and which in addition to allowing the outflow of gasses will prevent a flowing of air directly across the opening to develop objectionable vacuums which produce noise and counterflows within the ventilator pipe or stack.

Other objects and features of the present invention will become apparent from a consideration of the following description which proceeds with reference to the accompanying drawings.

DRAWINGS

Figure 1:
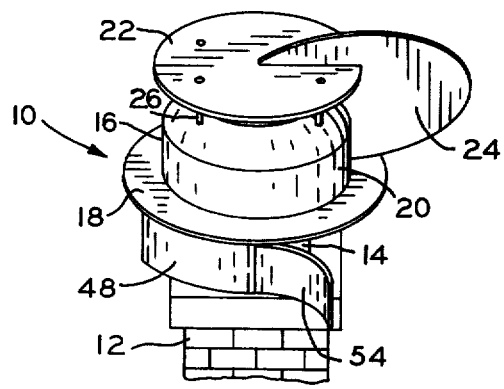
FIG. 1 is a perspective view showing the damper surmounted on a chimney.
Figure 3:
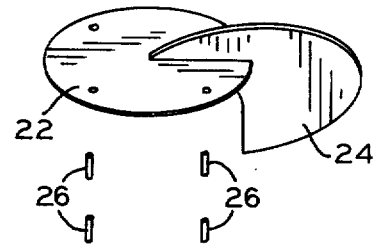
FIG. 3 is a side elevation view of the damper shown in FIG. 1.
Figure 3:
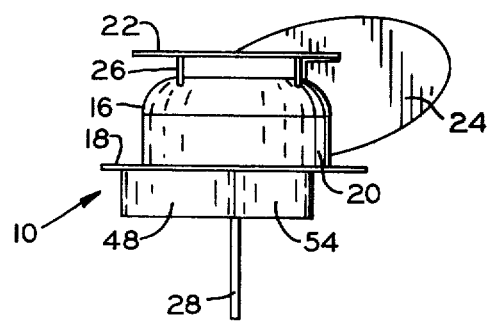
Figure 2:
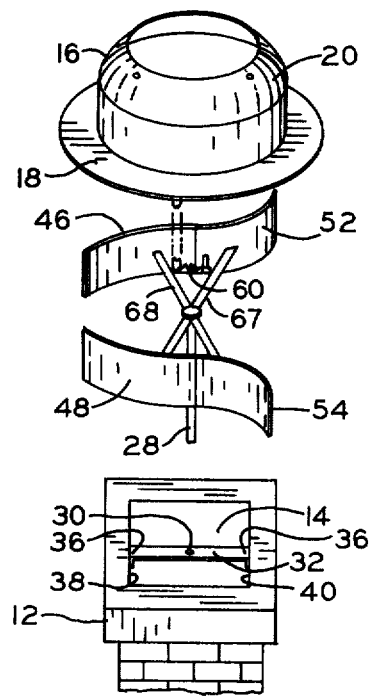
FIG. 2 is an exploded isometric view of the damper illustrated in FIG. 1.
Figure 4:
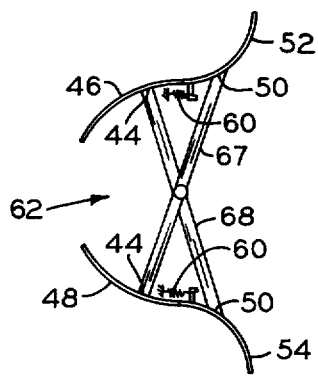
Figure 5:
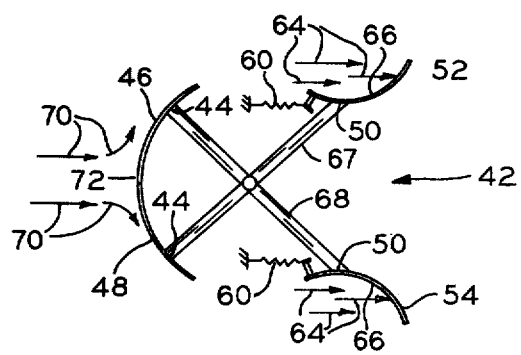

FIG. 4 is a detail view of the shutter, vane and linkage which is operated by the wind from the normal position shown in FIG. 4 wherein an aperture of the shutter assembly is in open position; and, FIG. 5 illustrates the shutter, vane and linkage of FIG. 4 after it has been operated to a second position by wind forces to effect closing of the aperture against spring resistance in the scissors linkage.

DETAILED DESCRIPTION OF THE INVENTION

Damper assembly 10 is mounted on chimney 12 over opening 14 and consists of a shield 16 with a rim 18 and a dome 20 whereon is mounted a plate 22 having a rudder 22. A number of mechanical fasteners such as bolts 26 are used to secure the plate 22 onto the shield 16. Below the damper is a rotatable shaft 28 which supports the assembly 10 and passes through a bearing opening 30 in a mounting member 32 secured at its opposite end 36 to the sides 38 and 40 of the chimney 12.

The entire assembly is rotatable with the shaft 28 in the bearing opening 30 and the assembly is responsive to the wind direction through the rudder 24 so that the damper assembly is always facing into the wind.

A scissors linkage 42 is also carried on the shaft 28 and is secured at its ends 44 to shutters 46 and 48 and at the other ends 50 with vanes 52 and 54. The scissors linkage is held normally in the position shown in FIG. 4 by means of a spring 60 which urges the shutters 46, 48 to a normally open position providing an aperture 62; and, when sufficient wind force (indicated by the arrows 64, FIG. 5) acts against the concave surfaces 66 of vanes 52, 54 to urge linkage arm 66 clockwise about shaft 28 and linkage arm 68 counterclockwise about 28 against the resistance of springs 60 the opening 62 is closed by shutters 46, 48 thus deflecting wind current as indicated by the arrows 70. The wind flow then follows the convexly shaped contour 72.

OPERATION

In operation, the assembly 10 is mounted on top of the chimney or flue 12 and the purpose is to so control the flow of wind around the opening 14 and it will prevent the occurrence of objectionable vacuum formation within the flue 12 by reducing or preventing the flow of air across the opening 14.

Vacuum is prevented in the present case by the rotatable device 10 being first positioned responsively to wind current through the rudder 24 so that the device 10 will always face into the wind at which position, vanes 52, 54 will catch the wind current in the manner indicated by the arrows 64 (FIG. 5) and the wind will operate the scissors linkage against the resistance of springs 60, bringing the shutters 46, 48 together thus restricting the opening 62 or entirely closing it as shown in FIG. 5. Consequently the wind is diverted in the manner indicated by the arrows 70 about the convexly shaped shutters 46, 48 and thereby shielding the flow of air past the opening 14.

In operation, the device is always directionally located by means of the rudder 24 such that the device 10 will be faced into the wind and, depending upon the intensity of the wind current, the aperture 62 will be partially or entirely closed, the degree of closure being determined by the extent of displacement of the shutters 46 and 48 and this is regulated by operation of the scissors linkages which are actuated by the action of the wind against the vanes 52 and 54. Thus, the degree of flow past the open end of the chimney or flue opening is regulated by the degree of wind flow as well as its direction. In this way, the occurrence of vacuum within the chimney is minimized or eliminated thus preventing occurrence of objectionable whistling and other sounds which can occur through the flue opening.

It should be understood from the description that a chimney and a fireplace are not the only type of flue openings that can be controlled in the manner indicated, skylights, soil pipes, cloths dryer vents and in short any stack from which there is vented gasses of one kind or another are equally controllable in the manner described by the indicated structure.

Although the present invention has been illustrated and described in connection with a few selected example embodiments, it will be understood that these are illustrative of the invention and are by no means restrictive thereof. It is reasonably to be expected that those skilled in this art can make numerous revisions and adaptations of the invention and it is intended that such revisions and adaptations will be included within the scope of the following claims as equivalents of the invention.

What is claimed is:

1. An improved chimney damper comprising shielding means surmounting the chimney, wind responsive means for positioning said shielding means and mounted on said shielding means to position said shielding means responsively to wind direction, mounting means for said shielding means adapted to provide for free turning movement of said shielding means relatively to the chimney, means forming an aperture between said shielding means and said chimney, and relatively movable closure means each having a wind-responsive vane means operatively secured one to each of said closure means and adapted to control the effective size of said aperture responsively to wind forces.

2. The damper in accordance with claim 1 including resilient means opposing the closing of said aperture by said closure means to maintain the aperture in a normally full-open condition.

3. The damper in accordance with claim 1 wherein said mounting means comprises a cross member extending through the open end of the chimney or flue and includes a bearing for mounting said chimney damper thereon for rotation relatively to said chimney or damper.

4. The improved damper construction in accordance with claim 1 wherein said closure means and said wind responsive vane means are operatively interconnected, and scissor linkages forming said connection between said closure means and said vane means whereby movement of the vane means responsively to wind forces will force said closure means closer together and effectively close said aperture thereby obstructing the passage of wind across the chimney.

5. An improved flue damper comprising mounting means disposed within the flue opening, vane means rotatably supported on said mounting means and having relatively movable closure means whereby wind force on said vane means force said closure means together to provide a closure for said flue opening and hood means also mounted on said mounting means to provide an aperture coverable by said closure means.

6. The construction in accordance with claim 5 wherein said hood means includes an annular brim affixed to the periphery of said hood means and a rudder secured to said hood means whereby wind force reacting on said rudder will cause said hood means to face into the wind.

7. The construction in accordance with claim 6 including scissor linkages wherein said flue damper includes a spring assembly having one end affixed to said brim and the other end affixed to said scissor linkages.

* * * * *